United States Patent
Liu et al.

(10) Patent No.: US 12,528,765 B2
(45) Date of Patent: Jan. 20, 2026

(54) CONTINUOUS SYNTHESIS METHOD OF 2-ACETAMIDO-5-NITROANISOLE

(71) Applicants: SHANDONG NORMAL UNIVERSITY EXPERIMENTAL PLANT CO., LTD, Jinan (CN); SHANDONG NORMAL UNIVERSITY, Jinan (CN)

(72) Inventors: Qikui Liu, Jinan (CN); Song Yang, Jinan (CN)

( * ) Notice: Subject to any disclaimer, the term of this patent is extended or adjusted under 35 U.S.C. 154(b) by 189 days.

(21) Appl. No.: 18/041,529

(22) PCT Filed: Apr. 21, 2022

(86) PCT No.: PCT/CN2022/088106
§ 371 (c)(1),
(2) Date: Feb. 13, 2023

(87) PCT Pub. No.: WO2022/237485
PCT Pub. Date: Nov. 17, 2022

(65) Prior Publication Data
US 2025/0042842 A1    Feb. 6, 2025

(30) Foreign Application Priority Data

May 8, 2021   (CN) .......................... 202110499585.6

(51) Int. Cl.
C07C 231/14    (2006.01)
C07C 231/24    (2006.01)

(52) U.S. Cl.
CPC .......... *C07C 231/14* (2013.01); *C07C 231/24* (2013.01)

(58) Field of Classification Search
None
See application file for complete search history.

(56) References Cited

FOREIGN PATENT DOCUMENTS

| CN | 1434026 A | 8/2003 |
|---|---|---|
| CN | 102382109 A | 8/2010 |

(Continued)

OTHER PUBLICATIONS

Kockinger et al. (Org. Process Res. Dev. 2020, 24, 2217-2227) (Year: 2020).*

(Continued)

*Primary Examiner* — Renee Claytor
*Assistant Examiner* — Jennifer C Sawyer

(57) ABSTRACT

The present invention relates to the field of organic synthesis and discloses a continuous synthesis process of 2-acetamido-5-nitroanisole; said process uses a microchannel continuous flow reactor as the main reaction equipment and o-anisidine as the starting materials to synthesize 2-acetamido-5-nitroanisole continuously via pre-acylation, amidation, and nitration reactions; through the use of a composite amidation reagent, the process can reduce the raw material costs and achieve the unity between the amidation reagent and the reactive solvent; by introducing the continuous production processes and equipment, it can realize continuous production, improve the degree of automation, and greatly reduce the production safety risks; in addition, it reduces the reaction time, as well as the production of by-products and the difficulty of their subsequent treatment, and improves the nitration selectivity, finally realizing a win-win situation in both economic and environmental benefits, which conforms to the development concept of "green chemistry".

9 Claims, 3 Drawing Sheets

(56) References Cited

FOREIGN PATENT DOCUMENTS

| | | |
|---|---|---|
| CN | 103113235 A | 5/2013 |
| CN | 109776337 A | 3/2019 |
| CN | 111704555 A | 9/2020 |
| CN | 113582867 A | 11/2021 |

OTHER PUBLICATIONS

Supporing information for Kockinger et al. (Org. Process Res. Dev. 2020, 24, 2217-2227) (Year: 2020).*

* cited by examiner

CONTINUOUS SYNTHESIS METHOD OF 2-ACETAMIDO-5-NITROANISOLE

FIELD OF THE INVENTION

The present invention relates to the field of chemical synthesis of dye intermediates and particularly to a continuous synthesis method of 2-acetamido-5-nitroanisole.

BACKGROUND OF THE INVENTION 2-acetamido-5-nitroanisole is an intermediate of preparing red base B (2-amino-5-nitroanisole), an important organic dye that appears as a yellowish or yellowish brown powdery solid. Red base B is used mainly in cotton fabric dyeing and color development of printing and also in the manufacture of rapid fast dyes, as well as jujube red, golden, black, and other organic pigments. It is widely used in the printing and dyeing industry with huge market demands. Synthesis methods of the red base B are mainly based on o-anisidine as raw materials and comprise three steps: amidation, nitration, and hydrolysis, wherein the hydrolysis step is mainly fixed as alkali or acid reflux at high temperature. Therefore, the preparation of the intermediate 2-acetamido-5-nitroanisole is vital for controlling costs and product quality.

The Chinese patent literature CN201010265810.1 has disclosed a preparation method of 1,8-diazafluoren-9-one, wherein acetic anhydride is used as the amidation reagent to obtain 2-amino-5-nitroanisole through acetylation, nitration, and alkali hydrolysis reactions, with a yield of 93%. Acetic anhydride can generate one molecule of acetic acid when used as an acetylation reagent, resulting in a low utilization rate of acetyl groups, and as excess acetic anhydride needs too much energy to recycle, residual acetic anhydride will also reduce the purity of the nitration products. In addition, as dichloromethane is used as the solvent in the nitration reaction, its high toxicity and volatility also increase the difficulty in recovery. The total reaction formula is as follows:

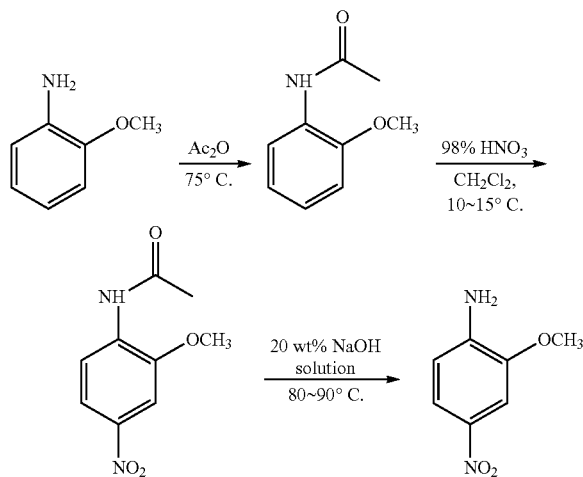

The Chinese patent literature CN201910170171.1 has disclosed a preparation method of 2-methoxy-4-nitroaniline, wherein acetic acid is used as the amidation reagent to obtain 2-amino-5-nitroanisole through acetylation, nitration, and alkali hydrolysis reactions. In this process, acetic acid is used as the amidation reagent and also as the reactive solvent of amidation and nitration reactions, which reduces the product treatment costs and improves the solvent recovery rate. However, as o-anisidine is subject to the amino oxidation reaction inevitably after prolonged high-temperature amidation, some unknown impurities will be generated; in addition, the use of a traditional reactor for nitration will prolong the duration of nitration, makes temperature difficult to control, and produce many impurities, finally affecting the product quality and yield. The total reaction formula is as follows:

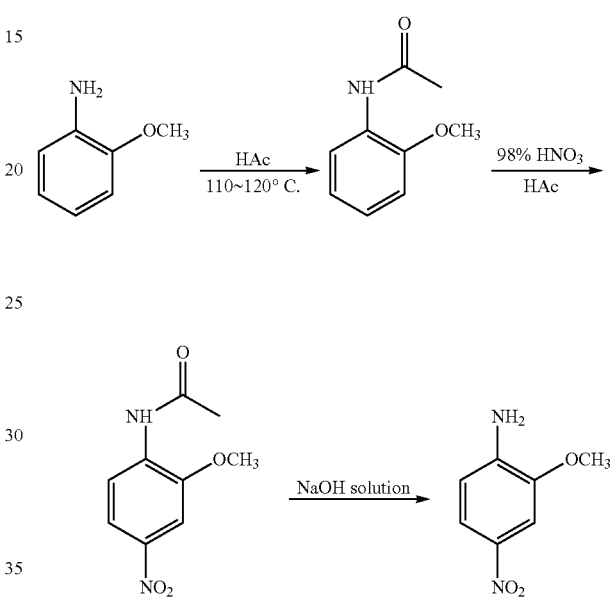

The above methods provide solutions to the production of the intermediate 2-acetamido-5-nitroanisole from different perspectives, but both have their shortcomings, including high amidation costs, high risk and low selectivity in nitration, poor product quality, long duration, etc. Therefore, there is an urgent need for an efficient and environmentally friendly new production process.

SUMMARY OF THE INVENTION

To address the drawbacks in the prior art, such as complicated production process, low safety, low product purity, poor product quality, and long duration, the present invention provides a continuous synthesis method of 2-acetamido-5-nitroanisole taking into consideration the production safety, production efficiency, product quality, economic effectiveness, environmental friendliness, and other factors.

A continuous synthesis method of 2-acetamido-5-nitroanisole based on the following mechanism:

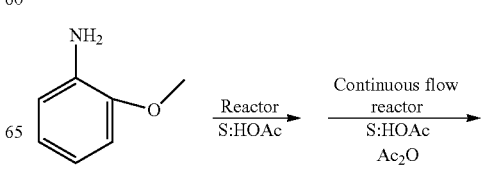

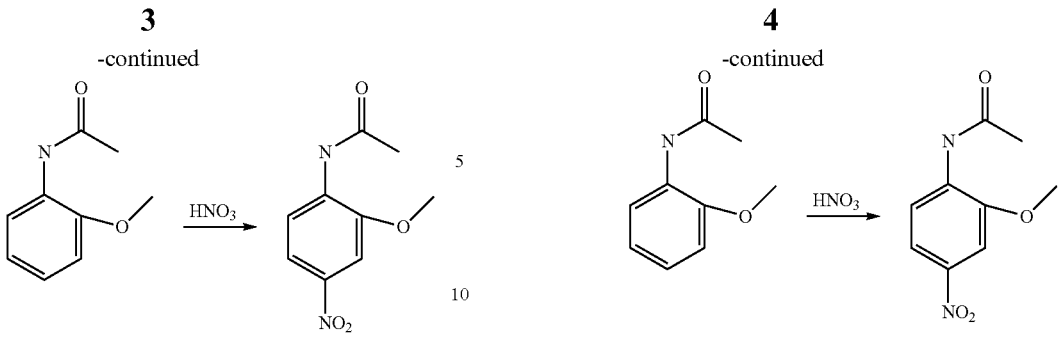

A technical solution of the present invention is provided below:

A continuous synthesis method of 2-acetamido-5-nitroanisole, wherein a microchannel reactor consisting of the first temperature zone and the second temperature zone in series is used as the reaction unit, and both the two temperature zones of the said microchannel reactor contain multiple reaction modules in series, comprising steps as follows:

(1) Pre-acylation: an acetic acid mixture containing 15-25% (mass fraction) of o-anisidine is prepared; then, the acetic acid mixture is added to the reactor and heated up by 20-35° C. to react for 1-5 h to obtain the acetic acid mixture reaction liquid;

(2) Amidation: the acetic acid mixture reaction liquid from step (1) and acetic anhydride are pumped into the first temperature zone of the microchannel reactor simultaneously and mixed up to complete the amidation reaction; the mass ratio between the acetic anhydride and the o-anisidine is 0.1-0.8:1, the amidation temperature is 20-35° C., and the amidation retention time in the first temperature zone is 0.5 min-2 min; then, the amidation reaction liquid is obtained;

(3) Nitration: the amidation reaction liquid from step (2) is allowed to continue to flow into the second temperature zone of the microchannel reactor, and 98% nitric acid is pumped into the second temperature zone to mix with the amidation reaction liquid and complete the nitration reaction; the mass ratio between the 98% nitric acid added and the o-anisidine is 1.03-1.3:1, the nitration temperature is 30-90° C., and the nitration retention time in the second temperature zone is 1-3 min;

(4) Posttreatment: the reaction liquid is quenched by ice water after flowing out from the microchannel reactor and stirred to precipitate crystals; then, 2-acetamido-5-nitroanisole is obtained upon filtration;

The reaction formula is as follows:

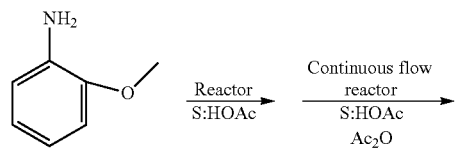

Preferably, the pre-acylation reaction temperature of the o-anisidine in step (1) is 20° C., and the reaction time is 1 h.

Preferably, the mass fraction between the o-anisidine and the mixture is 15% in step (1).

Preferably, the mass ratio between the acetic anhydride and the o-anisidine is 0.8:1 in step (2).

Preferably, the amidation temperature is 20° C. in step (2), and the amidation reaction time is 0.5 min.

Preferably, the mass ratio between the 98% nitric acid added and the o-anisidine is 1.03:1 in step (3).

Preferably, the nitration temperature is 30° C. in step (3), and the nitration time is 3 min.

Preferably, the microchannel reactor comprises 3-10 reaction modules.

Preferably, the first temperature zone comprises 1-4 reaction modules, and the second temperature zone comprises 2-6 reaction modules.

The Beneficial Effects of the Invention are as Follows

To address the drawbacks of the traditional production processes, including high amidation costs, high nitration risks, low selectivity, poor product quality, excessive purities, long reaction time, etc., the present invention proposes a continuous production process, wherein acetic acid is used as the pre-acylation reagent and solvent in the microchannel reactor, and acetic anhydride is added as the acylation reagent to complete the acetylation reaction; then, nitric acid is added to complete the nitration reaction, and the reaction liquid is quenched by ice water and stirred to precipitate crystals; finally, 2-acetamido-5-nitroanisole is obtained upon filtration. Such a production process has several advantages, including controllable impurities, reduced costs, easy operation, continuous production, security, and reliability, and conforms to the development concept of "green chemistry".

(1) Compared to the traditional amidation methods which use acetic anhydride or acetic acid, the process uses acetic acid for pre-acylation and acetic anhydride for supplemental amidation to improve the end reaction rate and shorten the period of the process. The use of acetic acid for amidation requires high activation energy, and with the progress of amidation, the concentration of acetic acid in the system decreases, and the amidation rate will decrease, resulting in a longer production cycle and difficulty in the control of amino oxide impurities. The supplement of acetic anhydride can quickly end the amidation reaction. Acetic anhydride can reduce the activation energy of amidation and quickly complete the amidation of the remaining o-anisidine at low temperatures, so adding an appropriate amount of acetic anhydride can quickly reduce the amidation time and control the production of amino oxide impurities.

(2) The process uses a microchannel reactor to complete the amidation and nitration reactions and uses acetic acid as the solvent for the amidation and nitration steps so as to avoid the necessity of treating intermediate solvents when different solvents are used in the two steps of reactions and enable both the amidation and nitration processes to form homogeneous solutions. The use of the continuous flow reactor also facilitates quick mixing and heat transfer to achieve continuous production operations and greatly reduces the possibilities of impurity formation such as super-nitration and poly-nitration due to uneven nitric acid distribution and local overheating. In addition, the use of the continuous flow production equipment allows the raw materials to feed continuously until the reactor is full so that the nitrification process can isolate oxygen, avoid the further oxidation of the products during the nitrification, and improve the safety, as well as the product selectivity and purity of the nitrification process.

EMBODIMENTS

For a better understanding of the technical solution in the present invention, the new method disclosed in the present invention is further described as follows in combination with the embodiments, but this should not be understood as limiting the scope of the subject matter of the invention to the following embodiments. All technologies realized based on the above contents of the invention belong to the scope of protection of the present invention.

Embodiment 1

Figure 1:
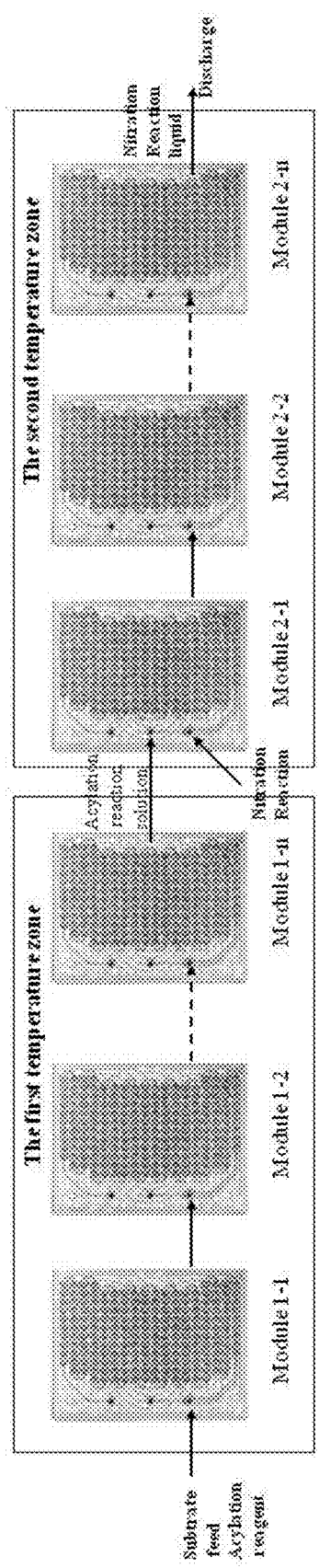
FIG. 1 shows the operating process flow diagram of the microchannel reactor in the present invention.
Figure 2:
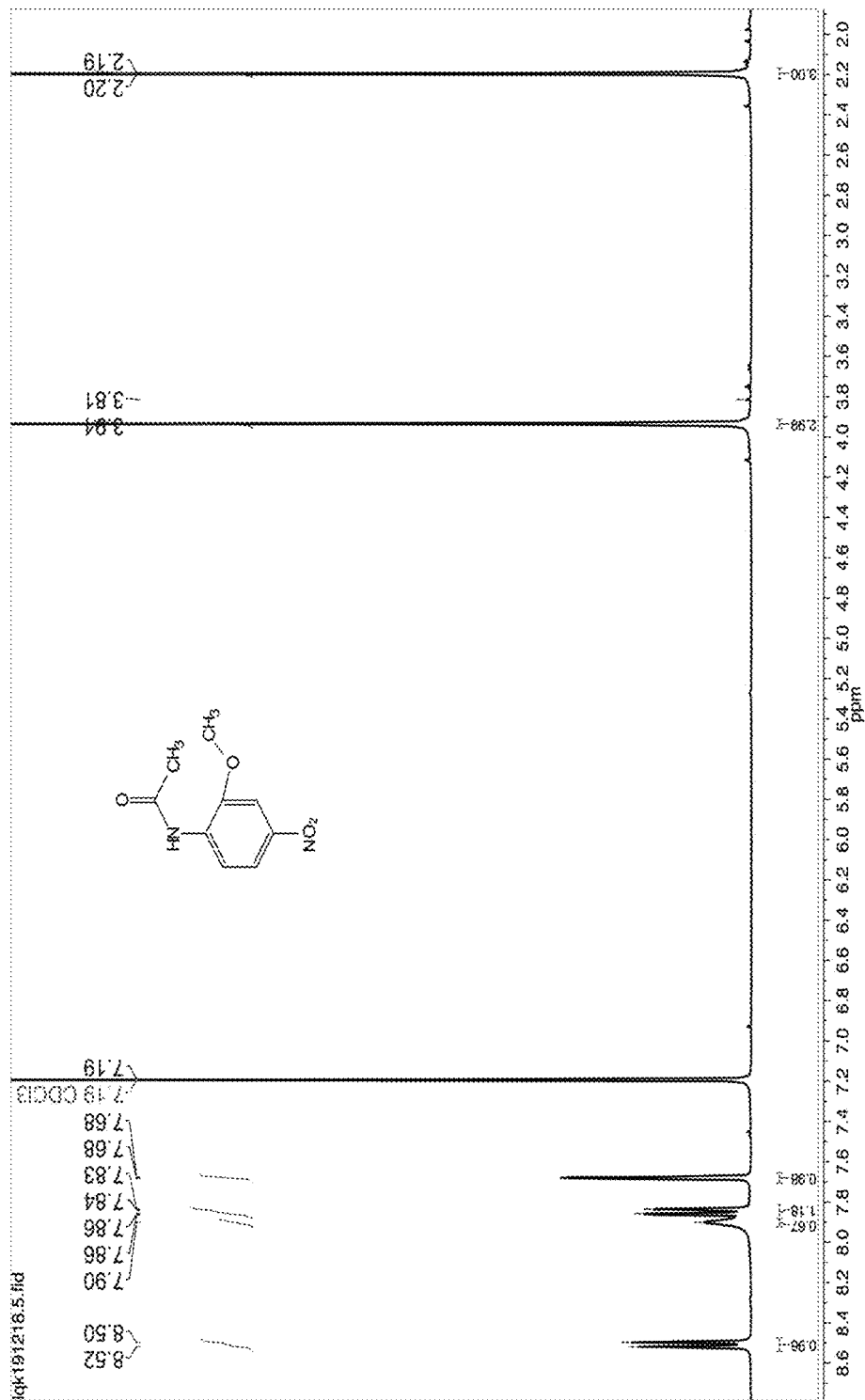
FIG. 2 shows the nuclear magnetic hydrogen spectrum of 2-acetamido-5-nitroanisole in Embodiment 1.
Figure 3:
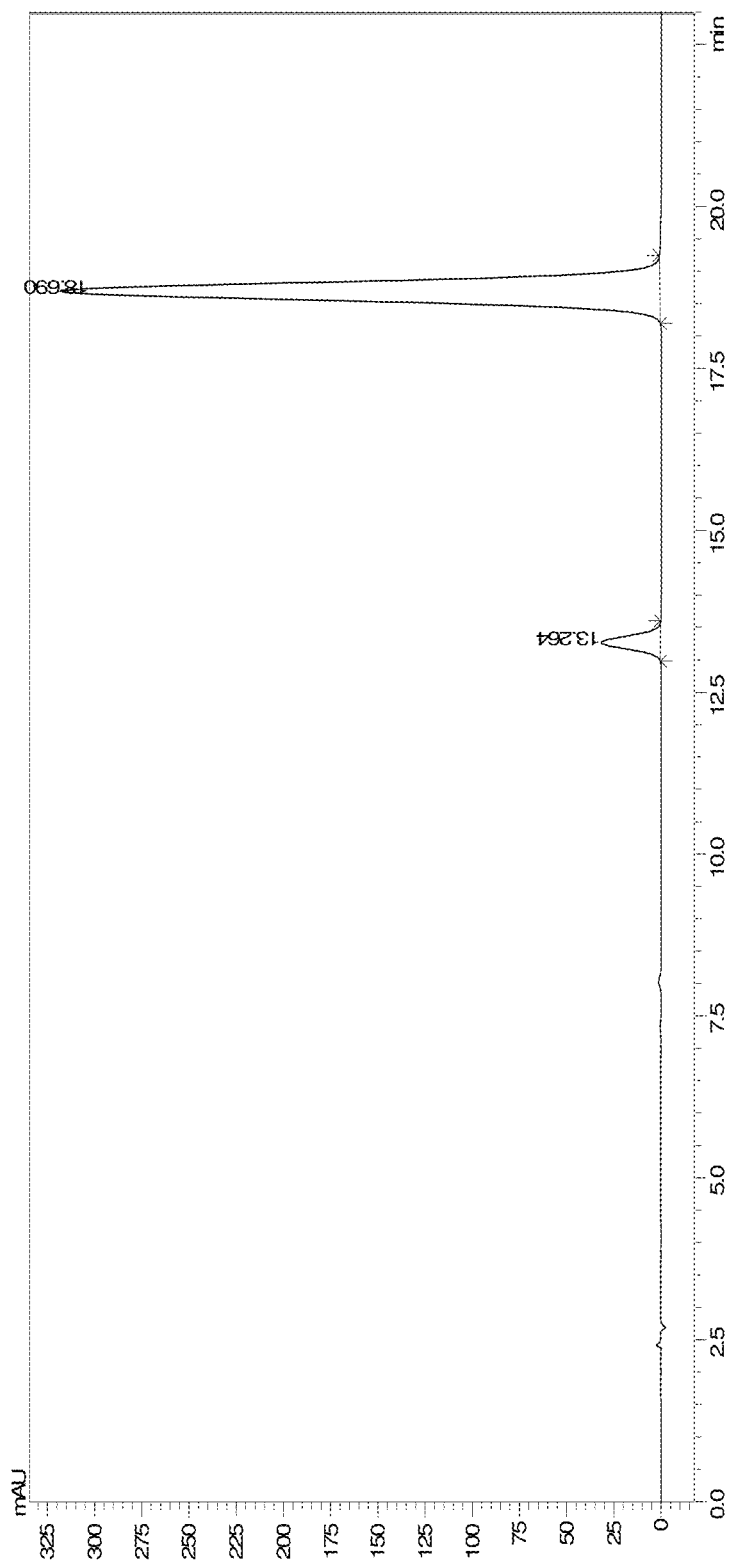
FIG. 3 shows the phase spectrum of the product reaction liquid in Embodiment 1.

A continuous synthesis method of 2-acetamido-5-nitroanisole, comprising the following steps in sequence:
(1) Pre-acylation: 9000 g of acetic acid mixture containing 15% (mass fraction) of o-anisidine is added to the reactor to react for 1 h under the controlled temperature of 20° C.;
(2) Amidation: the acetic acid mixture reaction liquid from step (1) and 859 g of acetic anhydride (8.8 mol) are pumped into the first temperature zone of the microchannel reactor simultaneously and mixed up to complete the amidation reaction; one reaction module is set up in the first temperature zone; the amidation temperature is 20° C., and the retention time is 0.5 min; then, the amidation reaction liquid is obtained;
(3) Nitration: the amidation reaction liquid from step (2) is allowed to continue to flow into the second temperature zone of the microchannel reactor, and 728.5 g of 98% nitric acid (11.35 mol) is pumped into the second temperature zone to mix with the amidation reaction liquid and complete the nitration reaction; two reaction modules are set up in the second temperature zone; the reaction temperature is 30° C., and the retention time is 1 min;
(4) Posttreatment: The reaction liquid is quenched by 10 kg of ice water after flowing out from the microchannel reactor and stirred for 10 min; then, the crude product of the present invention 2-acetamido-5-nitroanisole is obtained upon filtration and drying;

Upon testing and analysis by the liquid chromatograph, in this embodiment, the conversion rate of the o-anisidine in the acetylation reaction liquid is 99.9%, the conversation rate of the raw materials in the nitration reaction liquid is 98.8%, and the content of the crude product 2-acetamido-5-nitroanisole is 96.4% (FIG. 2). The nuclear magnetic hydrogen spectrum is shown in FIG. 1 ($\delta$ 8.52 (d, 1H), $\delta$ 7.90 (s, 1H), $\delta$ 7.86 (d, 1H), $\delta$ 7.68 (s, 1H), $\delta$ 3.94 (s, 3H), $\delta$ 2.20 (s, 3H)).

Embodiment 2

A continuous synthesis method of 2-acetamido-5-nitroanisole, comprising the following steps in sequence:
(1) Pre-acylation: 9000 g of acetic acid mixture containing 25% (mass fraction) of o-anisidine is added to the reactor and heated up by 35° C. to react for 5 h;
(2) Amidation: the acetic acid mixture reaction liquid from step (1) and 186.7 g of acetic anhydride (1.83 mol) are pumped into the first temperature zone of the microchannel reactor simultaneously and mixed up to complete the amidation reaction; four reaction modules are set up in the first temperature zone; the amidation temperature is 35° C., and the retention time is 2.0 min; then, the amidation reaction liquid is obtained;
(3) Nitration: the amidation reaction liquid from step (2) is allowed to continue to flow into the second temperature zone of the microchannel reactor, and 1529.4 g of 98% nitric acid (23.79 mol) is pumped into the second temperature zone to mix with the amidation reaction liquid and complete the nitration reaction; six reaction modules are set up in the second temperature zone; the reaction temperature is 90° C., and the retention time is 3 min;
(4) Posttreatment: The reaction liquid is quenched by 10 kg of ice water after flowing out from the microchannel reactor and stirred for 10 min; then, the crude product of the present invention 2-acetamido-5-nitroanisole is obtained upon filtration and drying;

Upon testing and analysis by the liquid chromatograph, in this embodiment, the conversion rate of the o-anisidine in the acetylation reaction liquid is 99.0%, the conversation rate of the raw materials in the nitration reaction liquid is 99.9%, and the content of the crude product 2-acetamido-5-nitroanisole is 95.4%.

Embodiment 3

A continuous synthesis method of 2-acetamido-5-nitroanisole, comprising the following steps in sequence:
(1) Pre-acylation: 9000 g of acetic acid mixture containing 20% (mass fraction) of o-anisidine is added to the reactor and heated up by 30° C. to react for 3 h;
(2) Amidation: the acetic acid mixture reaction liquid from step (1) and 744.6 g of acetic anhydride (7.3 mol) are pumped into the first temperature zone of the microchannel reactor simultaneously and mixed up to complete the amidation reaction; three reaction modules are set up in the first temperature zone; the amidation temperature is 30° C., and the retention time is 1.5 min;
(3) Nitration: the amidation reaction liquid from step (2) is allowed to continue to flow into the second temperature zone of the microchannel reactor, and 1126.3 g of 98% nitric acid (17.52 mol) is pumped into the second temperature zone to mix with the amidation reaction liquid and complete the nitration reaction; four reaction modules are set up in the second temperature zone; the reaction temperature is 60° C., and the retention time is 2 min;
(4) Posttreatment: The reaction liquid is quenched by 10 kg of ice water after flowing out from the microchannel reactor and stirred for 10 min; then, the product of the present invention 2-acetamido-5-nitroanisole is obtained upon filtration and drying;

Upon testing and analysis by the liquid chromatograph, in this embodiment, the conversion rate of the o-anisidine in the acetylation reaction liquid is 99.4%, the conversation rate of the raw materials in the nitration reaction liquid is 99.8%, and the content of the crude product 2-acetamido-5-nitroanisole is 94.3%.

Embodiment 4

A continuous synthesis method of 2-acetamido-5-nitroanisole, comprising the following steps in sequence:
(1) Pre-acylation: 9000 g of acetic acid mixture containing 20% (mass fraction) of o-anisidine is added to the reactor and heated up to 25° C. to react for 2 h;
(2) Amidation: the acetic acid mixture reaction liquid from step (1) and 596.7 g of acetic anhydride (5.85 mol) are pumped into the first temperature zone of the microchannel reactor simultaneously and mixed up to complete the amidation reaction; two reaction modules are set up in the first temperature zone; the amidation temperature is 35° C., and the retention time is 1.0 min;
(3) Nitration: the amidation reaction liquid from step (2) is allowed to continue to flow into the second temperature zone of the microchannel reactor, and 1032.4 g of 98% nitric acid (16.06 mol) is pumped into the second temperature zone to mix with the amidation reaction liquid and complete the nitration reaction; four reaction modules are set up in the second temperature zone; the reaction temperature is 40° C., and the retention time is 2 min;
(4) Posttreatment: The reaction liquid is quenched by 10 kg of ice water after flowing out from the microchannel reactor and stirred for 10 min; then, the product of the present invention 2-acetamido-5-nitroanisole is obtained upon filtration and drying;

Upon testing and analysis by the liquid chromatograph, in this embodiment, the conversion rate of the o-anisidine in the acetylation reaction liquid is 99.9%, the conversation rate of the raw materials in the nitration reaction liquid is 98.9%, and the content of the crude product 2-acetamido-5-nitroanisole is 94.0%.

Embodiment 5

A continuous synthesis method of 2-acetamido-5-nitroanisole, comprising the following steps in sequence:
(1) Pre-acylation: 9000 g of acetic acid mixture containing 20% (mass fraction) of o-anisidine is added to the reactor and heated up to 30° C. to react for 3 h;
(2) Amidation: the acetic acid mixture reaction liquid from step (1) and 596.7 g of acetic anhydride (5.85 mol) are pumped into the first temperature zone of the microchannel reactor simultaneously and mixed up to complete the amidation reaction; four reaction modules are set up in the first temperature zone; the amidation temperature is 30° C., and the retention time is 1.5 min;
(3) Nitration: the amidation reaction liquid from step (2) is allowed to continue to flow into the second temperature zone of the microchannel reactor, and 1032.4 g of 98% nitric acid (16.06 mol) is pumped into the second temperature zone to mix with the amidation reaction liquid and complete the nitration reaction; six reaction modules are set up in the second temperature zone; the reaction temperature is 60° C., and the retention time is 2 min;
(4) Posttreatment: the reaction liquid is quenched by 10 kg of ice water after flowing out from the microchannel reactor and stirred for 10 min; then, the product of the present invention 2-acetamido-5-nitroanisole is obtained upon filtration and drying;

Upon testing and analysis by the liquid chromatograph, in this embodiment, the conversion rate of the o-anisidine in the acetylation reaction liquid is 99.6%, the conversation rate of the raw materials in the nitration reaction liquid is 99.9%, and the content of the crude product 2-acetamido-5-nitroanisole is 96.1%.

Comparative Example 1

(1) 135 g (1.1 mol) of o-anisidine and 765 g of acetic acid are added to a 500 ml four-neck flask and stirred and heated up to 20° C. to react for 1 h. After the byproduct water is discharged via a rectification water separator, the acetic acid solution of the o-acetamidoanisole is obtained.
(2) 89.5 g of anhydride is added to and mixed up with the solution from step (1) to complete the amidation reaction; the amidation temperature is 30° C., and the reaction time is 0.5 min;
(3) 73 g (1.1 mol) of 98% nitric acid is dropwise added to the above solution after it is cooled down to 5° C.; in the dropwise adding process, the temperature in the reaction bottle is controlled not to exceed 10° C., and the dropwise adding is completed in about 1 hour; after that, the temperature is maintained constant for another 2 h until the reaction is finished.

Upon testing and analysis by the liquid chromatograph, in this comparative example, the conversion rate of the o-anisidine in the acetylation reaction liquid is 80.6%, the conversation rate of the raw materials in the nitration reaction liquid is 93.1%, and the content of the crude product 2-acetamido-5-nitroanisole is 84.5%.

Comparative Example 2

(1) Pre-acylation: 9000 g of acetic acid mixture containing 15% (mass fraction) of o-anisidine is added to the reactor to react for 1 h under the controlled temperature of 20° C.;
(2) Amidation: the solution from step (1) is pumped into the first temperature zone of the microchannel reactor to complete the amidation reaction; one reaction module is set up in the first temperature zone; the amidation temperature is 30° C., and the retention time is 0.5 min;
(3) Nitration: the amidation reaction liquid from step (2) is allowed to continue to flow into the second temperature zone of the microchannel reactor, and 728.5 g of 98% nitric acid (11.35 mol) is pumped into the second temperature zone to mix with the amidation reaction liquid and complete the nitration reaction; two reaction modules are set up in the second temperature zone; the reaction temperature is 30° C., and the retention time is 1 min;

(4) Posttreatment: The reaction liquid is quenched by 10 kg of ice water after flowing out from the microchannel reactor and stirred for 10 min; then, the crude product of the present invention 2-acetamido-5-nitroanisole is obtained upon filtration and drying;

Upon testing and analysis by the liquid chromatograph, in this embodiment, the conversion rate of the o-anisidine in the acetylation reaction liquid is 63.5%, the conversation rate of the raw materials in the nitration reaction liquid is 95.6%, and the content of the crude product 2-acetamido-5-nitroanisole is 81.1%.

Comparative Example 3

(1) Pre-acylation: 9000 g of acetic acid mixture containing 15% (mass fraction) of o-anisidine is added to the reactor to react for 1 h under the controlled temperature of 20° C.;
(2) Amidation: the solution from step (1) and 859 g of acetic anhydride (8.8 mol) are pumped into the first temperature zone of the microchannel reactor simultaneously and mixed up to complete the amidation reaction; one reaction module is set up in the first temperature zone; the amidation temperature is 30° C., and the retention time is 0.5 min; upon distillation under reduced pressure, the acetic acid and the excess acetic anhydride are recycled; after the temperature drops to 30° C., dichloromethane is added to the distillation residue;

(3) Nitration: the solution from step (2) is allowed to continue to flow into the second temperature zone of the microchannel reactor, and 728.5 g of 98% nitric acid (11.35 mol) is pumped into the second temperature zone to mix with the solution and complete the nitration reaction; two reaction modules are set up in the second temperature zone; the reaction temperature is 30° C., and the retention time is 1 min;

(4) Posttreatment: The reaction liquid is quenched by 10 kg of ice water after flowing out from the microchannel reactor and stirred for 10 min; then, the crude product of the present invention 2-acetamido-5-nitroanisole is obtained upon filtration and drying;

Upon testing and analysis by the liquid chromatograph, in this embodiment, the conversion rate of the o-anisidine in the acetylation reaction liquid is 99.9%, the conversation rate of the raw materials in the nitration reaction liquid is 93.3%, and the content of the crude product 2-acetamido-5-nitroanisole is 90.2%.

A comparison between the technical advantages of the embodiments and the comparative examples is made as follows:

| | Process | | | | | Product | | |
| --- | --- | --- | --- | --- | --- | --- | --- | --- |
| | Reactor | Safety | Reaction time (acylation) | Reaction time (nitration) | Production efficiency | Conversion rate of the acylation reaction, % | Conversion rate of the nitration reaction, % | 2-acetamido-5-nitroanisole, purity % |
| Embodiment 1 | Continuous flow reactor (microchannel) | High | 60.5 min | 1 min | High | 99.9 | 98.8 | 96.4 |
| Embodiment 2 | Continuous flow reactor (microchannel) | High | 302 min | 3 min | High | 99 | 99.9 | 95.4 |
| Embodiment 3 | Continuous flow reactor (microchannel) | High | 181 min | 2 min | High | 99.4 | 99.8 | 94.3 |
| Embodiment 4 | Continuous flow reactor (microchannel) | High | 121 min | 2 min | High | 99.9 | 98.9 | 94 |
| Embodiment 5 | Continuous flow reactor (microchannel) | High | 185 min | 2 min | High | 99.6 | 99.9 | 96.1 |
| Comparative example 1 | Batch tank reactor | Low | 60.5 min | 120 min | Low | 80.6 | 93.1 | 84.5 |
| Comparative example 2 | Continuous flow reactor (microchannel) | High | 60.5 min | 1 min | Low | 63.5 | 95.6 | 81.1 |
| Comparative example 3 | Continuous flow reactor (microchannel) | High | 60.5 min | 1 min | Low | 99.9 | 93.3 | 90.2 |

What is claimed is:

1. A continuous synthesis method of 2-acetamido-5-nitroanisole, wherein a microchannel reactor consisting of a first temperature zone and a second temperature zone in series is used as a reaction unit, and both the two temperature zones of the said microchannel reactor contain multiple reaction modules in series, comprising the following steps:

(i) pre-acylation: an acetic acid mixture containing a mass fraction of 15-25% of o-anisidine is prepared; then, the acetic acid mixture is added to the reactor and heated to 20-35° C., reacting for 1-5 h to obtain the acetic acid mixture reaction liquid;

(ii) amidation: the acetic acid mixture reaction liquid from step (i) and acetic anhydride are pumped into the first temperature zone of the microchannel reactor simultaneously and mixed to complete the amidation reaction; the mass ratio between the acetic anhydride and the o-anisidine is 0.1-0.8:1, the amidation temperature is 20-35° C., and the amidation retention time in the first temperature zone is 0.5 min-2 min; then, the amidation reaction liquid is obtained;

(iii) nitration: the amidation reaction liquid from step (ii) is allowed to continue to flow into the second temperature zone of the microchannel reactor, and 98% nitric acid is pumped into the second temperature zone to mix with the amidation reaction liquid and complete the nitration reaction; the mass ratio between the 98% nitric acid and the o-anisidine is 1.03-1.3:1, the nitration temperature is 30-90° C., and the nitration retention time in the second temperature zone is 1-3 min; and (iv) posttreatment: the reaction liquid is quenched by ice water after flowing out from the microchannel reactor and stirred to precipitate crystals; then, 2-acetamido-5-nitroanisole is obtained upon filtration;

the reaction formula is as follows:

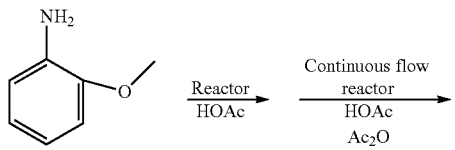

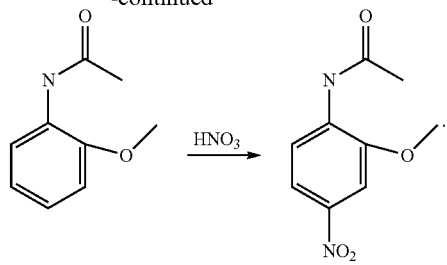

2. The said continuous synthesis method of 2-acetamido-5-nitroanisole according to claim 1, wherein the pre-acylation reaction temperature of the o-anisidine in the said step (i) is 20° C., and the reaction time is 1 h.

3. The said continuous synthesis method of 2-acetamido-5-nitroanisole according to claim 1, wherein the mass fraction between the o-anisidine and the acetic acid mixture is 15% in the said step (i).

4. The said continuous synthesis method of 2-acetamido-5-nitroanisole according to claim 1, wherein the mass ratio between the acetic anhydride and the o-anisidine is 0.8:1 in the said step (ii).

5. The said continuous synthesis method of 2-acetamido-5-nitroanisole according to claim 1, wherein the amidation temperature is 20 C. in the said step (ii), and the amidation reaction time is 0.5 min.

6. The said continuous synthesis method of 2-acetamido-5-nitroanisole according to claim 1, wherein the mass ratio between the 98% nitric acid added and the o-anisidine is 1.03:1 in the said step (iii).

7. The said continuous synthesis method of 2-acetamido-5-nitroanisole according to claim 6, wherein the nitration temperature is 30° C. in the said step (iii), and the nitration time is 3min.

8. The said continuous synthesis method of 2-acetamido-5-nitroanisole according to claim 1, wherein the said microchannel reactor comprises 3-10 reaction modules.

9. The said continuous synthesis method of 2-acetamido-5-nitroanisole according to claim 1, wherein the said first temperature zone comprises 1-4 reaction modules, and the said second temperature zone comprises 2-6 reaction modules.

* * * * *